United States Patent
Lee et al.

(10) Patent No.: US 11,804,070 B2
(45) Date of Patent: Oct. 31, 2023

(54) METHOD AND APPARATUS WITH LIVENESS DETECTION

(71) Applicant: Samsung Electronics Co., Ltd., Suwon-si (KR)

(72) Inventors: Hana Lee, Suwon-si (KR); Solae Lee, Suwon-si (KR); Minsu Ko, Suwon-si (KR); Jiwon Baek, Hwaseong-si (KR); Seungju Han, Seoul (KR)

(73) Assignee: Samsung Electronics Co., Ltd., Suwon-si (KR)

(*) Notice: Subject to any disclaimer, the term of this patent is extended or adjusted under 35 U.S.C. 154(b) by 258 days.

(21) Appl. No.: 16/807,565

(22) Filed: Mar. 3, 2020

(65) Prior Publication Data

US 2020/0349372 A1    Nov. 5, 2020

(30) Foreign Application Priority Data

May 2, 2019    (KR) .................. 10-2019-0051495
Aug. 28, 2019    (KR) .................. 10-2019-0105867

(51) Int. Cl.
G06F 21/32    (2013.01)
G06N 3/08    (2023.01)
(Continued)

(52) U.S. Cl.
CPC .......... G06V 40/169 (2022.01); G06F 18/214 (2023.01); G06N 3/08 (2013.01);
(Continued)

(58) Field of Classification Search
None
See application file for complete search history.

(56) References Cited

U.S. PATENT DOCUMENTS 8,254,691 B2 * 8/2012 Kaneda ................ G06V 40/176
                                                382/103
2006/0204053 A1 * 9/2006 Mori .................... G06K 9/00
                                                382/118
(Continued)

FOREIGN PATENT DOCUMENTS

JP    2008-186303 A    8/2008
JP    2008-191743 A    8/2008
(Continued)

OTHER PUBLICATIONS

Jee et al., "Liveness Detection for Embedded Face Recognition System," World Academy of Science, Engineering and Technology 18 2008 (Year: 2008).*

(Continued)

*Primary Examiner* — Soo Shin
(74) *Attorney, Agent, or Firm* — NSIP Law

(57) ABSTRACT

A liveness detection method and apparatus, and a facial verification method and apparatus are disclosed. The liveness detection method includes detecting a face region in an input image, measuring characteristic information of the face region, adjusting the measured characteristic information in response to the characteristic information not satisfying a condition, and performing a liveness detection on the face region with the adjusted characteristic information upon the measured characteristic information not satisfying the condition.

32 Claims, 10 Drawing Sheets

(51) Int. Cl.
*G06V 10/20* (2022.01)
*G06V 10/24* (2022.01)
*G06V 40/16* (2022.01)
*G06V 40/40* (2022.01)
*G06F 18/214* (2023.01)

(52) U.S. Cl.
CPC ............ *G06V 10/20* (2022.01); *G06V 10/243* (2022.01); *G06V 40/162* (2022.01); *G06V 40/171* (2022.01); *G06V 40/45* (2022.01)

(56) References Cited

U.S. PATENT DOCUMENTS

| | | | | |
|---|---|---|---|---|
| 2009/0087038 | A1* | 4/2009 | Okada | G06V 40/175 382/118 |
| 2012/0243742 | A1* | 9/2012 | Sato | G06V 40/171 382/103 |
| 2014/0139655 | A1* | 5/2014 | Mimar | G08B 21/0476 340/575 |
| 2016/0379042 | A1* | 12/2016 | Bourlai | G06V 40/172 382/118 |
| 2018/0025217 | A1 | 1/2018 | Chandraker et al. | |
| 2018/0276455 | A1 | 9/2018 | An et al. | |
| 2018/0293429 | A1 | 10/2018 | Wechsler et al. | |
| 2018/0307946 | A1 | 10/2018 | Kuroda et al. | |
| 2018/0349682 | A1 | 12/2018 | Wong et al. | |
| 2019/0034708 | A1 | 1/2019 | Yoo et al. | |
| 2019/0065994 | A1 | 2/2019 | Wang et al. | |
| 2019/0122404 | A1* | 4/2019 | Freeman | G06V 40/161 |
| 2020/0349372 | A1* | 11/2020 | Lee | G06V 40/169 |
| 2021/0117709 | A1* | 4/2021 | Halet | G06V 40/16 |
| 2021/0279316 | A1* | 9/2021 | Eisen | G06V 30/40 |
| 2021/0295532 | A1* | 9/2021 | Lee | G06V 10/761 |

FOREIGN PATENT DOCUMENTS

| | | |
|---|---|---|
| JP | 4999570 B2 | 8/2012 |
| JP | 2012-185846 A | 9/2012 |
| JP | 2013-196295 A | 9/2013 |
| KR | 10-2017-0050465 A | 5/2017 |
| KR | 10-2018-0022019 A | 3/2018 |
| KR | 10-2018-0109594 A | 10/2018 |

OTHER PUBLICATIONS

Extended European Search Report dated Oct. 1, 2020 in counterpart to US Application No. 2016-9680.4 (11 pages in English).
Hyung-Keun Jee et al., "Liveness Detection for Embedded Face Recognition System" *World Academy of Science, Engineering and Technology*, 18, Jan. 1, 2008 (4 pages in English).
Jennifer C Dela Cruz et al., "Personalized 1-15 Photo Enhancement Using Artificial Neural Network", Jan. 1, 2018 *Journal of Telecommunication, Electronic and Computer Engineering*, vol. 10, No. 1-15 (5 pages in English).
Abdalmageed et al., "Face Recognition Using Deep Multi-Pose Representations," WACV2016, Mar. 23, 2016, 9 pages.
Tian et al., "DeepTest: Automated Testing of Deep-Neural Network-driven Autonomous Cars," ICSE2018, Mar. 20, 2018, 12 pages.
Pei et al., "Towards Practical Verification of Machine Learning: The Case of Computer Vision Systems," Cornell 2017, Dec. 16, 2017, 16 pages.
Ito et al. "A Study of a Liveness Detection Method Using Fully Convolutional Network for Face Recognition Systems." *Graduate School of Information Science of Tohoku University*. (2017) pp. 1-6.
Japanese Office Action dated Apr. 19, 2022 in corresponding Japanese Patent Application No. 2020-075172 (4 pages in English, 8 pages in Japanese).
Korean Office Action dated Sep. 17, 2022, in counterpart Korean Patent Application No. 10-2019-0105867 (8 pages in English, 11 pages in Korean).
Alotaibi et al., "Deep face liveness detection based on nonlinear diffusion using convolution neural network," SIViP, Nov. 8, 2016, pp. 713-720.
Extended European Search Report dated Jun. 22, 2022, in counterpart European Patent Application No. 20169680.4 (7 Pages).

* cited by examiner

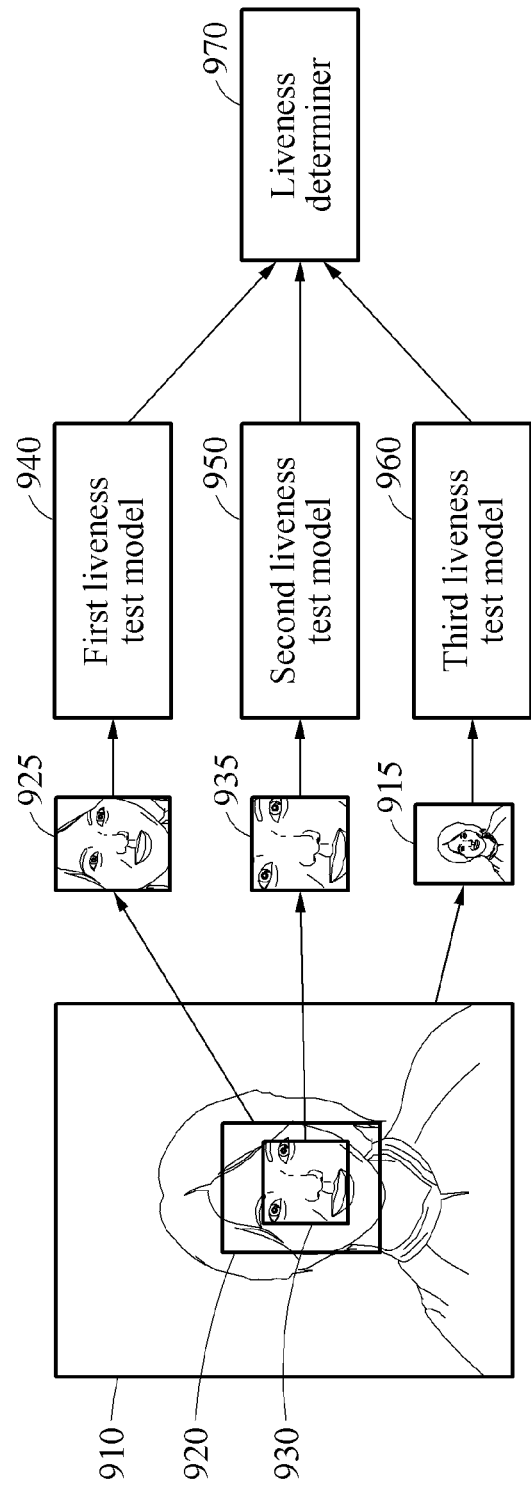

METHOD AND APPARATUS WITH LIVENESS DETECTION

CROSS-REFERENCE TO RELATED APPLICATIONS

This application claims the benefit under 35 USC 119(a) of Korean Patent Application No. 10-2019-0051495 filed on May 2, 2019, and Korean Patent Application No. 10-2019-0105867 filed on Aug. 28, 2019, in the Korean Intellectual Property Office, the entire disclosures of which are incorporated herein by reference for all purposes.

BACKGROUND

1. Field

The following description relates to a method and apparatus with liveness detection, and a method and apparatus with liveness detection and facial verification.

2. Description of Related Art

In a user verification system, a computing apparatus may determine whether to allow a user to have access to the computing apparatus based on verification information provided by the user. The verification information may include, for example, a password input by the user and biometric information of the user. The biometric information may include, for example, information associated with a fingerprint, an iris, and a face of the user.

Face spoofing approaches exist, where the face spoofing may be a type of attack using, for example, an image, a video, or a mask that intends to spoof or trick an underlying device or system to believe that an authorized user or person is attempting access or use of the device.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a liveness detection method includes detecting a face region in an input image, measuring characteristic information of the detected face region, in response to the measured characteristic information being determined as not satisfying a condition, generating an adjusted face region by adjusting the characteristic information of the face region, and performing a liveness detection on the adjusted face region.

The measuring of the characteristic information of the face region may include measuring a hue value of the face region.

The generating of the adjusted face region may include performing the generating of the adjusted face region by adjusting the hue value of the face region to a hue value included in the preset hue value range in response to a determination that the measured hue value is not included in a preset hue value range.

The adjusting of the hue value of the face region may include adjusting the measured hue value of the face region by applying a hue adjustment model to the face region.

The measuring of the characteristic information of the face region may include measuring a face tilt value indicating a degree of a tilt of a face included in the face region.

The measuring of the face tilt value may include detecting feature points corresponding to a left eye, a right eye, and both mouth ends in the face region, and measuring the face tilt value based on the detected feature points.

The generating of the adjusted face region may include performing the generating of the adjusted face region by adjusting the face tilt value in response to a determination that the measured face tilt value is not included in a preset face tilt value range.

The adjusting of the face tilt value may include adjusting the face tilt value by rotating the face region based on the measured face tilt value.

The measuring of the characteristic information of the face region may include measuring a white balance value of the face region.

The generating of the face adjusted region may include performing the generating of the adjusted face region by adjusting the white balance value of the face region to a white balance value included in the preset white balance value range in response to a determination that the measured white balance value is not included in a preset white balance value range.

The method may further include performing the liveness detection based on the detected face region without performing the generating of the adjusted face region in response to a determination that the measured characteristic information satisfies the condition.

The performing of the liveness detection may include performing the liveness detection using a neural network-based liveness detection model.

The measuring of the characteristic information of the face region may include measuring any one or any combination of any two or more of a hue value, a face tilt value, and a white balance value of the face region. In response to any one or any combination of any two or more of the measured hue value, the measured face tilt value, and the measured white balance value being respectively determined to be out of range of a preset hue value range, a preset face tilt value range, and a preset white balance value range, generating the adjusted face region by respectively adjusting the hue value, the face tilt value, and the white balance value to respectively fall within the preset hue value range, the preset face tilt value range, and the preset white balance value range.

A non-transitory computer-readable storage medium may store instructions that, when executed by one or more processors, configure the one or more processors to perform the method above.

A neural network may be used to perform a facial verification on the adjusted face region.

In another general aspect, a facial verification method using a neural network, the facial verification method includes extracting a current facial image of a face region from an input image, calculating a current image feature value of the current facial image, comparing the current image feature value to a range of respective image feature values of training facial images, in response to a determination that the current image feature value is out of the range of the respective image feature values, generating an adjusted current facial image by adjusting the current image feature value of the current facial image to be included in the range of the respective image feature values, and inputting of the adjusted current facial image to the neural network.

A plurality of facial images each having an image feature value may be used to train the neural network.

The range of the respective image feature values may be an absolute range determined based on a minimum image feature value and a maximum image feature value among the image feature values of the training facial images.

The range of the respective image feature values may be a statistical range determined based on a distribution characteristic of the image feature values of the training facial images. The distribution characteristic may include a mean and a standard deviation of the image feature values.

The statistical range may be a range of 1 standard deviation on both sides from the mean as a center.

The statistical range may be a range of 2 standard deviations on both sides from the mean as a center.

The statistical range may be a range of 3 standard deviations on both sides from the mean as a center.

The statistical range may be a range of 4 standard deviations on both sides from the mean as a center.

The neural network may be configured to perform a liveness detection on a face object in the input image.

The neural network may be configured to verify a face object in the input image.

The calculating of the current image feature value may include calculating a hue value of the current facial image. The adjusting of the current facial image may include generating the adjusted current facial image by adjusting the hue value of the current facial image to be included in the range of the respective image feature values in response to a determination that the calculated hue value is out of the range of the respective image feature values.

The calculating of the current image feature value may include calculating a face tilt value indicating a degree of a tilt of a face in the current facial image. The adjusting of the current facial image may include generating the adjusted current facial image by rotating the face region of the current facial image so a tilt value of the adjusted current facial image to be included in the range of the respective image feature values in response to a determination that the calculated face tilt value is out of the range of the respective image feature values.

The calculating of the current image feature value may include calculating a white balance value of the face region in the current facial image. The adjusting of the current facial image may include generating the adjusted current facial image by adjusting the white balance value of the current facial image so a while balance value of the adjusted current facial image to be included in the range of the respective image feature values in response to a determination that the calculated white balance value is out of the range of the respective image feature values.

In another general aspect, an apparatus includes one or more processors configured to detect a face region in an input image, measure characteristic information of the detected face region, generate an adjusted face region by adjusting the characteristic information of the face region in response to the measured characteristic information being determined as not satisfying a condition, and perform a liveness detection on the adjusted face region.

The apparatus may further include a memory storing instructions that when executed by the one or more processors configures the one or more processors to detect the face region in the input image, measure the characteristic information of the detected face region, generate the adjusted face region by adjusting the characteristic information of the face region in response to the measured characteristic information being determined as not satisfying the condition, and perform the liveness detection on the adjusted face region.

The one or more processors may be further configured to measure a hue value of the face region, and perform the generating of the adjusted face region by adjusting the hue value of the face region to a hue value included in the preset hue value range in response to a determination that the measured hue value is not included in a preset hue value range.

The one or more processors may be further configured to measure a face tilt value indicating a degree of a tilt of a face included in the face region, and perform the generating of the adjusted face region by adjusting the face tilt value in response to a determination that the measured face tilt value is not included in a preset face tilt value range.

The one or more processors may be further configured to measure a white balance value of the face region, and perform the generating of the adjusted face region by adjusting the white balance value of the face region in response to a determination that the measured white balance value is not included in a preset white balance value range.

The one or more processors may be further configured to perform the liveness detection based on the detected face region without performing the generating of the adjusted face region in response to a determination that the measured characteristic information satisfies the condition.

The one or more processors may be further configured to perform the liveness detection using a neural network-based liveness detection model.

The apparatus may be any of a smartphone, a wearable device, a tablet computer, a netbook, a laptop computer, a desktop computer, a personal digital assistant (PDA), a set-top box, a home appliance, a biometric door lock, a security device, and a vehicle start device.

In another general aspect, an apparatus using a neural network includes one or more processors configured to extract a current facial image of a face region from an input image, calculate a current image feature value of the current facial image, compare the current image feature value to a range of respective image feature values of training facial images, generate an adjusted current face region by adjusting the current facial image such that the current image feature value of the current facial image is included in the range of the respective image feature values in response to a determination that the current image feature value is out of the range of the respective image feature values, and input the adjusted current facial image to the neural network.

The apparatus may further include a memory storing instructions that when executed by the one or more processors configures the one or more processors to extract the current facial image of the face region from the input image, calculate the current image feature value of the current facial image, compare the current image feature value to the range of respective image feature values of the training facial images, generate the adjusted current face region by adjusting the current facial image such that the current image feature value of the current facial image is included in the range of the respective image feature values in response to the determination that the current image feature value is out of the range of the respective image feature values, and input the adjusted current facial image to the neural network.

A plurality of facial images each having an image feature value may be used to train the neural network.

The range of the respective image feature values may be an absolute range to be determined based on a minimum image feature value and a maximum image feature value among the image feature values of the facial images used to train the neural network.

The range of the respective image feature values may be a statistical range to be determined based on a distribution characteristic of the image feature values of the facial images used to train the neural network. The distribution characteristic may include a mean and a standard deviation of the image feature values.

The neural network may be used to verify a face object in the input image.

The one or more processors may be configured to calculate a hue value of the current facial image, and generate the adjusted current facial image by adjusting the hue value of the current facial image to be included in the range of the respective image feature values in response to a determination that the calculated hue value is out of the range of the respective image feature values.

The one or more processors may be configured to calculate a face tilt value indicating a degree of a tilt of a face in the current facial image, and generate the adjusted current facial image by rotating the face region of the current facial image so a tilt value of the adjusted current facial image is included in the range of the respective image feature values in response to a determination that the calculated face tilt value is out of the range of the respective image feature values.

The one or more processors may be configured to calculate a white balance value of the face region in the current facial image, and generate the adjusted current facial image by adjusting the white balance value of the current facial image to be included in the range of the respective image feature values in response to a determination that the calculated white balance value is out of the range of the respective image feature values.

The one or more processors may be configured to calculate any one or any combination of any two or more of a hue value, a face tilt value, and a white balance value of the current facial image, and in response to any one or any combination of any two or more of the calculated hue value, the calculated face tilt value, and the calculated white balance value being respectively determined to be out of the range of respective image feature values, generating the adjusted face region by respectively adjusting the out of range image feature values to be within the respective range of image feature values.

The apparatus may be any of a smartphone, a wearable device, a tablet computer, a netbook, a laptop computer, a desktop computer, a personal digital assistant (PDA), a set-top box, a home appliance, a biometric door lock, a security device, and a vehicle start device.

Other features and aspects will be apparent from the following detailed description, the drawings, and the claims

BRIEF DESCRIPTION OF THE DRAWINGS

FIGS. 9A and 9B are diagrams illustrating an example of liveness detection methods.

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
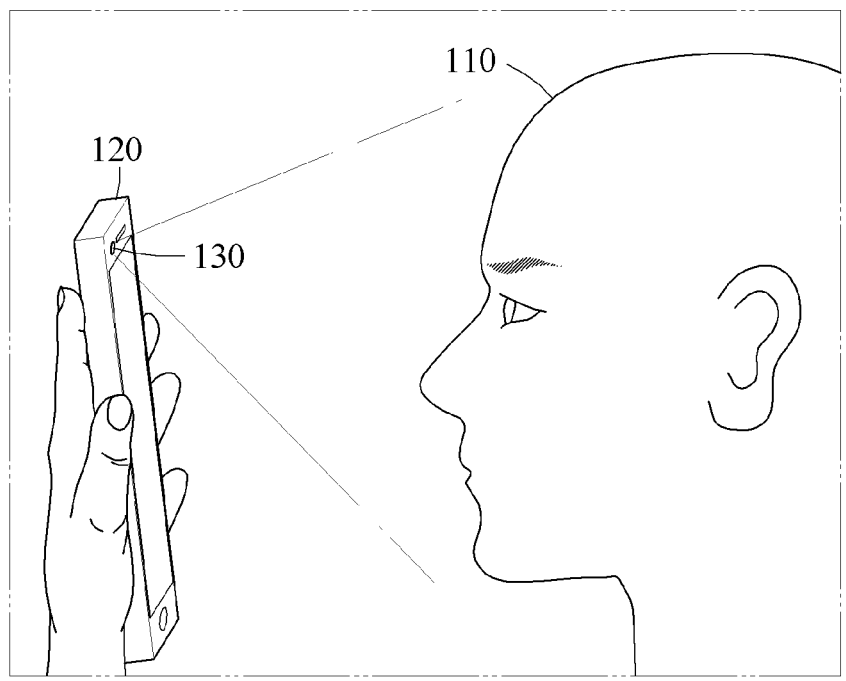
FIGS. 1 and 2 are diagrams illustrating an example of liveness detection and facial verification.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

In addition, terms such as first, second, A, B, (a), (b), and the like may be used herein to describe components. Each of these terminologies is not used to define an essence, order, or sequence of a corresponding component but used merely to distinguish the corresponding component from other component(s).

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween. Likewise, expressions, for example, "between" and "immediately between" and "adjacent to" and "immediately adjacent to" may also be construed as described in the foregoing.

Unless otherwise defined, all terms, including technical and scientific terms, used herein have the same meaning as commonly understood by one of ordinary skill in the art to which this disclosure pertains consistent with and after an understanding of the present disclosure. Terms, such as those defined in commonly used dictionaries, are to be interpreted as having a meaning that is consistent with their meaning in the context of the relevant art and the present disclosure, and are not to be interpreted in an idealized or overly formal sense unless expressly so defined herein.

Also, in the description of example embodiments, detailed description of structures or functions that are thereby known after an understanding of the disclosure of the present application will be omitted when it is deemed that such description will cause ambiguous interpretation of the example embodiments.

Hereinafter, examples will be described in detail with reference to the accompanying drawings, and like reference numerals in the drawings refer to like elements throughout.

A face anti-spoofing technology may be used to determine whether a face of a user input to such a device or system is a fake face or a genuine face. Such face anti-spoofing technology may include extracting features, such as, for example, a local binary pattern (LBP), a histogram of oriented gradients (HOG), and a difference of Gaussians (DoG), from an input image and determining whether an input face is fake or genuine based on the extracted features.

Figure 2:
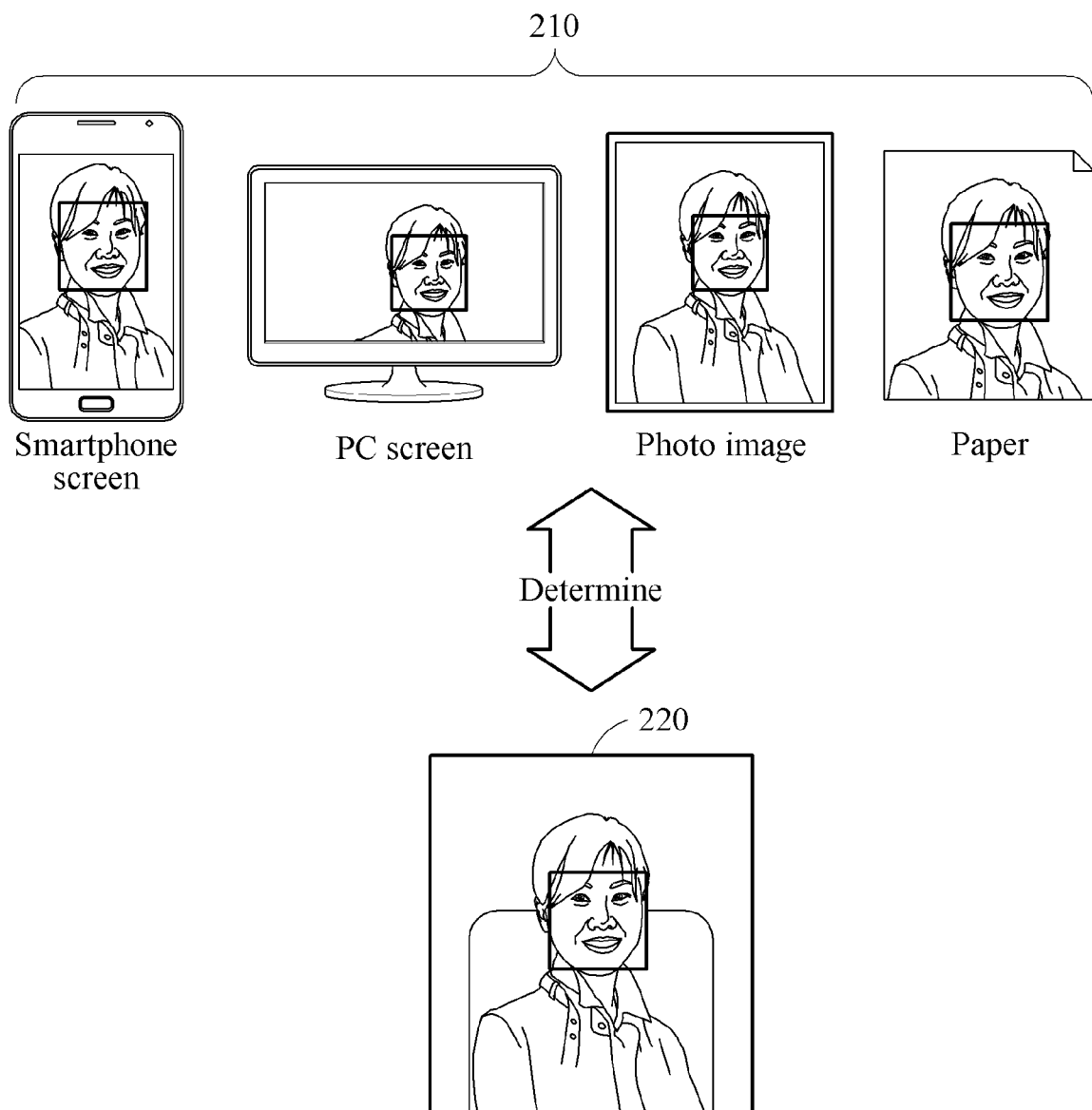

FIGS. 1 and 2 are diagrams illustrating an example of liveness detection and facial verification.

Biometrics is one of the user verification methods that uses personal bioinformation, including, for example, a fingerprint, an iris, a face, a vein, and skin of an individual. Among the user verification methods, a facial verification method may be used to determine whether a user is a valid user, and/or not a valid user, based on information of a face of the user when the user attempts to use his/her face to perform facial verification to, for example, unlock a device, log into a device, perform payment services, and perform access control operations, as various embodiments.

Referring to FIG. 1, an electronic apparatus 120 determines whether to verify (or authenticate) a user 110 who attempts to connect to the electronic apparatus 120 through facial verification. For example, when the user 110 attempts, or is detected or determined to be attempting, the facial verification through the electronic apparatus 120 to cancel a lock mode of the electronic apparatus 120, the electronic apparatus 120 obtains a facial image of the user 110 using an image sensor or an image acquirer such as a camera 130, analyzes the obtained facial image, and then determines whether to cancel the lock mode of the electronic apparatus 120. In an example, the analysis of the facial image may include detecting a face region in the facial image and extracting features from the detected face region using a feature extractor. The extracted features may be compared to registered features of a valid user, and whether the facial verification is successful may be determined based on a result of comparing the extracted feature(s) to the registered feature(s) of the valid user. In response to a determination that the facial verification is successful, the user 110 may successfully cancel the lock mode, e.g., the electronic apparatus 120 may automatically include access to the electronic apparatus 100 dependent on the result of the comparison. Conversely, in response to a determination that the facial verification is not successful, the electronic apparatus 120 may continue to operate in the lock mode. For another example, when the user 110 attempts the facial verification to use a payment service through the electronic apparatus 120, the electronic apparatus 120 obtains a facial image of the user 110, analyzes the obtained facial image, and selectively approves a payment request from the user 110 when the user 110 is recognized as a valid user as a result of the analyzing the obtained facial image, or rejects the payment request otherwise.

In an example, a valid user may register a face of the valid user in advance in the electronic apparatus 120 through a facial registration process, and the electronic apparatus 120 may store, in a storage device or cloud storage, information to be used to identify the valid user. In this example, a facial image of the valid user, or a facial feature extracted from the facial image, may be stored as an example of registration information of the valid user.

In an example, in biometric verification, such as the facial verification described above, a liveness detection may be performed. The liveness detection may be performed before or after a result of the biometric verification is determined. Alternatively, the biometric verification and the liveness detection may be performed simultaneously. The liveness detection may be performed to determine whether a test object, which is a target for the liveness detection, is live. That is, the liveness detection may be performed to determine whether a methodology or biometric characteristics used for verification is genuine. For example, the liveness detection is performed to determine whether a face in an image captured by the camera 130 is a genuine face or a fake face. The liveness detection may be performed to distinguish, using captured image(s), between a lifeless object (e.g., a photograph, an image, a paper, and a replica as a fake mechanism or form) and a living object (e.g., a live human being) by distinguishing whether the object in the captured image is or is more likely a live object or the object is or is more likely a spoofed object.

FIG. 2 illustrates examples of a fake face 210 and an example of a genuine face 220. The electronic apparatus 120 identifies the genuine face 220 in a test object image that is obtained by capturing an image of a genuine face of a valid user, through a liveness detection process. In addition, the electronic apparatus 120 identifies the fake face 210 in a test object image that is obtained by capturing an image of the genuine face of the valid user which is displayed on a screen of a smartphone or a screen of a personal computer (PC), or printed on a paper, or an image of a replica modeled after the genuine face of the user.

An invalid user may try to use a spoofing technique in an attempt to obtain a false acceptance by a user verification system. For example, the invalid user may present, to the camera 130, a color image, a video, a replica, and the like in which a face of a valid user appears, to obtain a false acceptance in facial verification. The liveness detection may be used to prevent such false acceptance by filtering out, or blocking, an attempt for the verification made based on such spoofing technique. When a verification object is determined to be a lifeless object as a result of the liveness detection, the verification object may not be allowed to proceed to user verification in which it is compared to a registered object to verify whether it matches the registered object or not, or the user verification may be finally determined to be unsuccessful irrespective of a result of the user verification.

Referring back to FIG. 1, the electronic apparatus 120 may perform any one of the liveness detection and the biometric verification, or both the liveness detection and the biometric verification. The electronic apparatus 120 may be a smartphone, a wearable device, a tablet computer, a netbook, a laptop computer, a desktop computer, a personal digital assistant (PDA), a set-top box, a home appliance, a biometric door lock, a security device, and a vehicle start device, as non-limiting examples. Herein, it is noted that use of the term 'may' with respect to an example or embodiment, e.g., as to what an example or embodiment may include or implement, means that at least one example or embodiment exists where such a feature is included or implemented while all examples and embodiments are not limited thereto.

In such a liveness detection process, the electronic apparatus 120 may comprehensively consider various elements of an image captured by the camera 130. For example, the electronic apparatus 120 may determine whether a test object is live based on at least one of shape information associated with an overall shape of a face in the captured image, texture information associated with a texture of a partial face, or context information. An image captured when an object is in a remote location may also include a clue as to whether the object is a screen of a display device or a paper. For example, an image may include a hand of a user holding the display device or the paper, which provides a clue to a determination that the object is fake. Such an attempt for a false acceptance may also be effectively detected based on the context information. In addition, the shape information of an overall face shape may be used to determine the reflection of light and distortion of the shape which may be used to determine a result of a liveness detection. As a non-limiting example, such light reflection in a photo image or a paper, which is one of various means for such an attempt, may be different from that on a genuine face, and such shape distortion may occur due to a wrinkle or crease of the photo image or the paper. A liveness detection may be performed based on these foregoing elements. In addition, based on the texture information, a fine difference in texture which may be used to distinguish between a real human skin, and a paper and/or a screen of a display device. Thus, the electronic apparatus 120 may comprehensively apply various levels of such liveness determining elements to improve the accuracy of the liveness detection and perform the liveness detection more robustly.

For the liveness detection or facial verification, a neural network may be used. When the neural network is used for the liveness detection, the neural network may provide a liveness value indicating a value, a probability value, or a feature value indicating whether a test object corresponds to a genuine face or a fake face based on input data. In contrast, when the neural network is used for facial verification, the neural network may provide a feature value based on input data.

Through training, parameters to form the neural network may be determined. In a training process, there may be numerous sets of training data and the desired value for each of the sets of training data. In the training process, the neural network may receive training data and output a result value corresponding to the received training data through a calculation or computation based on the parameters. A loss may be calculated from a difference between the output result value and the desired value. The parameters forming the neural network may be adjusted to reduce the loss, and the neural network may be trained as described above. The training process may be performed repeatedly on each of the sets of training data, and the parameters of the neural network may thus be adjusted to be more desirable.

In examples, in the training process, training data may be configured to include various sets of data such that the neural network learns or trains various cases. However, it may not always be possible to cover or include all the cases by or in the training data. Thus, in an actual liveness detection or facial verification, there may be a case that is not learned or trained, or not fully learned or trained, in the training process. The case is also referred to herein as a corner case. The corner case is not fully learned or trained, and thus a result of processing such corner case may not be accurate.

In addition, training data corresponding to such a corner case may be relatively less in number compared to training data corresponding to a general case. Thus, when training is performed using the training data corresponding to the corner case, the performance of the neural network may be degraded. When the training data corresponding to the corner case is used in an actual training process, data variation of the training data may increase, and thus it may not be easy to train the neural network to output a desired result value.

However, according to one or more example embodiments to be described hereinafter, although the liveness detection and/or the facial verification is performed on such corner case, it is possible to transform the corner case into a sufficiently or fully trained case in the training process for the neural network through a preprocessing operation based on a type of the corner case, and perform the liveness detection and/or the facial verification robustly against the corner case. Thus, it is possible to improve the accuracy of a result of processing the corner case.

Figure 3:
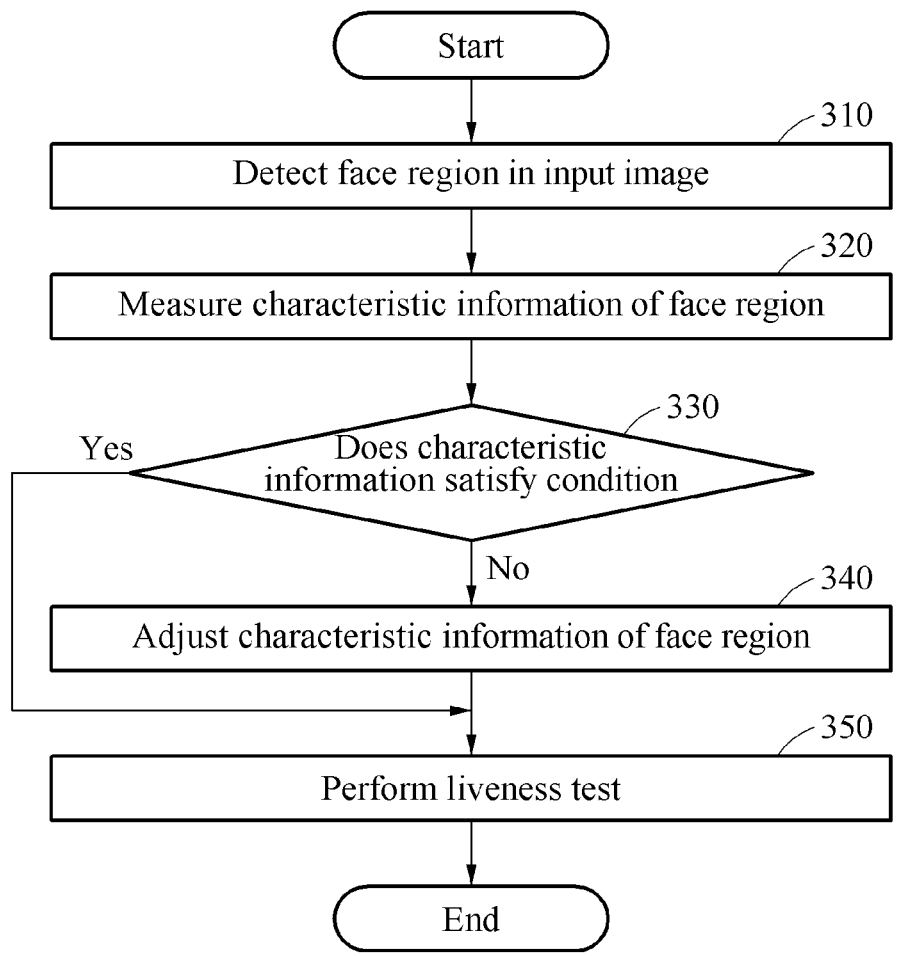
FIG. 3 is a flowchart illustrating an example of liveness detection method.

FIG. 3 is a flowchart illustrating an example of a liveness detection method. The liveness detection method to be described hereinafter may be performed by a facial verification apparatus.

Referring to FIG. 3, in operation 310, the facial verification apparatus detects a face region in an input image. The input image refers to an image input to the facial verification apparatus, which is a target on which a liveness detection is to be performed. The input image may be obtained by an image acquisition apparatus such as a digital still camera, a video camera, and the like. The image acquisition apparatus may be included in the facial verification apparatus, or present outside the facial verification apparatus.

The facial verification apparatus may detect the face region using, as a non-limiting example, a neural network configured to detect a face region in an input image, a haar-based cascade adaboost classifier, and a Viola-Jones detector, and the like in various examples. However, examples are not limited to what is described in the foregoing, and the facial verification apparatus may detect the face region in the input image using various face region detecting methods. As a non-limiting example, the facial verification apparatus may detect facial landmarks in the input image and detect, as the face region, a bounding region, including the detected facial landmarks.

In operation 320, the facial verification apparatus measures characteristic information of the face region. The characteristic information may be a value indicating one or more image features of the face region and/or one or more face object or image-related features in the face region. The facial verification apparatus may measure the characteristic information, such as, as a non-limiting example, a hue of the face region, a face tilt indicating a degree of a tilt of the face included in the face region, and a white balance, a brightness, and a gamma of the face region, and the like. The facial verification apparatus may measure at least one of such various values described in the foregoing.

The characteristic information such as the hue, the white balance, the brightness, and the gamma of the face region and the like may be measured using an image quality evaluation method used to evaluate a quality of an image.

For the characteristic information associated with the face tilt, the facial verification apparatus may detect feature points corresponding to a left eye, a right eye, and both mouth ends in the face region, and measure the face tilt based on the detected feature points. In an example, the facial verification apparatus measures the face tilt based on an angle formed between a reference line (e.g., vertical line or horizontal line), and a determined straight line passing a determined first center point between feature points of the left eye and the right eye and a determined second center point between feature points corresponding to both mouth ends.

In operation 330, the facial verification apparatus determines whether the measured characteristic information satisfies a condition. In an example, the facial verification apparatus may determine whether the characteristic information calculated for the face region in the input image is included in a feature value range of facial images used to train a neural network-based liveness detection model. Each of the facial images used for the training may have characteristic information (or a feature value), and the feature value range may be determined based on the respective feature values of the facial images. Herein, the characteristic information may be a feature value, and thus, the term characteristic information will be used interchangeably with the term feature value. As a non-limiting example, the feature value range may be an absolute range defined as a range between a minimum feature value and a maximum feature value among the feature values of the facial images, or a statistical range determined by a distribution characteristic, for example, a mean and a standard deviation, of the feature values of the facial images. The statistical range may be broader or narrower than the absolute range based on a standard by which it is defined.

For example, for the characteristic information associated with the hue of the face region, the facial verification apparatus may determine whether at least one of hues, for example, red (R), green (G), and blue (B) elements, is included in a preset range or respective preset ranges. For the characteristic information associated with the face tilt, the facial verification apparatus may determine whether the face tilt is included in a preset face tilt range. For the characteristic information associated with the white balance, the brightness, or the gamma, the facial verification apparatus may determine whether such characteristic information is included in a preset range or respective ranges. The condition may be set before the liveness detection or changed during or in the middle of the liveness detection.

In operation 340, in response to a determination that the measured characteristic information does not satisfy the condition(s), the facial verification apparatus adjusts the characteristic information of the face region. In an example, the facial verification apparatus may adjust the characteristic information of the face region such that the characteristic information measured from the face region of the input image is included in the corresponding feature value range (s) of the facial images used to train the liveness detection model. The feature value range may be the absolute range or the statistical range, for example. That the characteristic information of the face region is not included in the feature value range may indicate that the input image, which is a current liveness test object, corresponds to a corner case. Here, the facial verification apparatus may preprocess the face region such that the characteristic information of the face region is included in the feature value range of the facial images used for the training, and thus increase the accuracy of a result of the liveness detection. Herein, preprocessing may be understood as a process performed or input prior to a liveness detection model's inference operation is performed with respect to the input information, e.g., using the result of the preprocessor.

For example, when the measured hue of the face region is not included in the preset range, the facial verification apparatus adjusts the hue of the face region to a hue included in the range. The facial verification apparatus adjusts the hue of the face region by applying a hue adjustment model to the face region. The hue adjustment model may perform a function of changing the hue of the face region to, as a non-limiting example, an average hue of training images. Through such hue adjustment, a color distribution, for example, a distribution of RGB elements, of the face region may be changed to be similar to a color distribution of the training images.

For another example, when the measured face tilt is not included in the preset range, the facial verification apparatus adjusts the face tilt. The facial verification apparatus adjusts the face tilt by rotating the face region of the input image based on the measured face tilt. The facial verification apparatus rotates the face region by an angle such that the face tilt is included in the range.

For still another example, when the measured white balance, brightness, and/or gamma is not included in the preset range, the facial verification apparatus adjusts the white balance, the brightness, and/or the gamma of the face region such that the white balance, the brightness, and/or the gamma of the face region is included in the range.

In operation 350, when the characteristic information is adjusted in operation 340, the facial verification apparatus performs the liveness detection on the adjusted face region, detected in operation 310, e.g., with the adjusted characteristic information. In response to a determination that the characteristic information satisfies the condition in operation 330, the facial verification apparatus does not adjust the characteristic information, and performs the liveness detection based on the face region detected in operation 310.

The liveness detection model may be, for example, a neural network configured to output a value calculated, based on internal parameters of the neural network, based on input data. The liveness detection model may provide a liveness value indicating a value, a probability value, or a feature value that indicates whether a face object, which is a test object, is a genuine face or a fake face based on input data. That is, the liveness value may be a value to be used, as a reference, to determine the liveness of the object. The liveness detection model may be based on a deep convolutional neural network (DCNN) model, as a non-limiting example. The DCNN model may include one or more convolution layers, one or more pooling layers, and a fully connected layer, for example. The DCNN model may provide information to be used for the determination of liveness based on image information input to the liveness detection model through respective operations performed by each of the layers. The image information may be pixel values, as a non-limiting example, color values and/or brightness values, of pixels included in an image. However, the DCNN model is provided merely as an example, and thus the liveness detection model may be based on a neural network model of another architecture different from that of the DCNN model.

In an example, the facial verification apparatus determines a first liveness value based on a first image corresponding to the detected face region. The first liveness value is obtained when image information of the first image is input to a first liveness detection model, and the first liveness detection model outputs the first liveness value corresponding to the image information of the first image. The first image may include shape information of an entire region of the detected face region. The first liveness value determined based on the first image may be associated with features or characteristics of light reflection and shape distortion that are used to identify an attempt to have a false acceptance using, for example, a fake image.

The facial verification apparatus determines a second liveness value based on a second image corresponding to a partial region of the detected face region. The partial region may be obtained by extracting a smaller region from the detected face region. The partial region may be extracted randomly from the detected face region, or a region of a preset size based on a center of the detected face region may be extracted as the partial face region.

The second liveness value is obtained when image information of the second image is input to a second liveness detection model, and the second liveness detection model outputs the second liveness value corresponding to the image information of the second image. The second image may include texture information of the partial face region. The second liveness value determined based on the second image may be associated with a fine difference in texture that is used to identify an attempt to have a false acceptance using, for example, a fake image.

The facial verification apparatus determines a third liveness value based on a third image corresponding to an entire region of the input image. The third liveness value is obtained when image information of the third image is input to a third liveness detection model, and the third liveness detection model outputs the third liveness detection value corresponding to the entire region of the input image. The third liveness value determined based on the input image may be associated with context features or characteristics used to identify an attempt to have a false acceptance using, for example, a fake image.

In this example described in the foregoing, the first liveness value, the second liveness value, and the third liveness value may be reference values to be used to determine the liveness of a test object, and be determined by the respective liveness detection models. In addition, when the characteristic information of the face region is adjusted, the first liveness value, the second liveness value, and the third liveness value may be determined based on the first image, the second image, and the third image, respectively, to which the face region with the adjusted characteristic information is applied.

Alternatively, the first liveness value, the second liveness value, and the third liveness value may be determined by a single liveness detection model. As a non-limiting example, the image information of the first image, the image information of the second image, and the image information of the entire region of the input image may be input to the single liveness detection model, and the single liveness detection model may output the first liveness value, the second liveness value, and the third liveness value from at least one output layer.

The facial verification apparatus determines whether the test object is live based on the first liveness value, the second liveness value, and the third liveness value. In an example, the facial verification apparatus determines a final liveness value based on all the first liveness value, the second liveness value, and the third liveness value. As a non-limiting example, the facial verification apparatus may determine, to be the final liveness value, a sum or a mean value of the first liveness value, the second liveness value, and the third liveness value. For another example, the facial verification apparatus may apply a weight to at least one of the first liveness value, the second liveness value, or the third liveness value, and determine the final liveness value based on a result of the applying, for example, a weighted sum. As the weight, a preset constant may be used, or different weights may be applied to the first liveness value, the second liveness value, and the third liveness value. Alternatively, the weight may be a conditional weight that is determined based on a condition, for example, a distance to the test object, an image quality, a size of the face region, a facial pose in the face region, a location of the face region, a presence or an absence of an occluded region in the face region, and a state of illumination of the face region.

In another example, the facial verification apparatus determines the final liveness value based on at least one of the first liveness value, the second liveness value, or the third liveness value. As a non-limiting example, the final liveness value may be determined based on the first liveness value, the second liveness value, the third liveness value, or any combinations thereof.

The facial verification apparatus determines whether the test object is live based on whether the final liveness value satisfies the preset condition. As a non-limiting example, in response to the final liveness value being greater than a preset threshold value, the facial verification apparatus determines the test object to be live, or genuine. Conversely, in response to the final liveness value being less than or equal to the threshold value, the facial verification apparatus determines the test object to be lifeless, or fake.

In an example, the facial verification apparatus may perform a control operation in response to a result of performing a liveness test on an object. In response to a final determination that the test object is a live object, the facial verification apparatus may generate a control signal to request the execution of a user verification process. However, in response to a final determination that the test object is a fake object which is not a live genuine object, the facial verification apparatus may generate a control signal to block access by a user, without requesting the execution of the user verification process.

Figure 4:
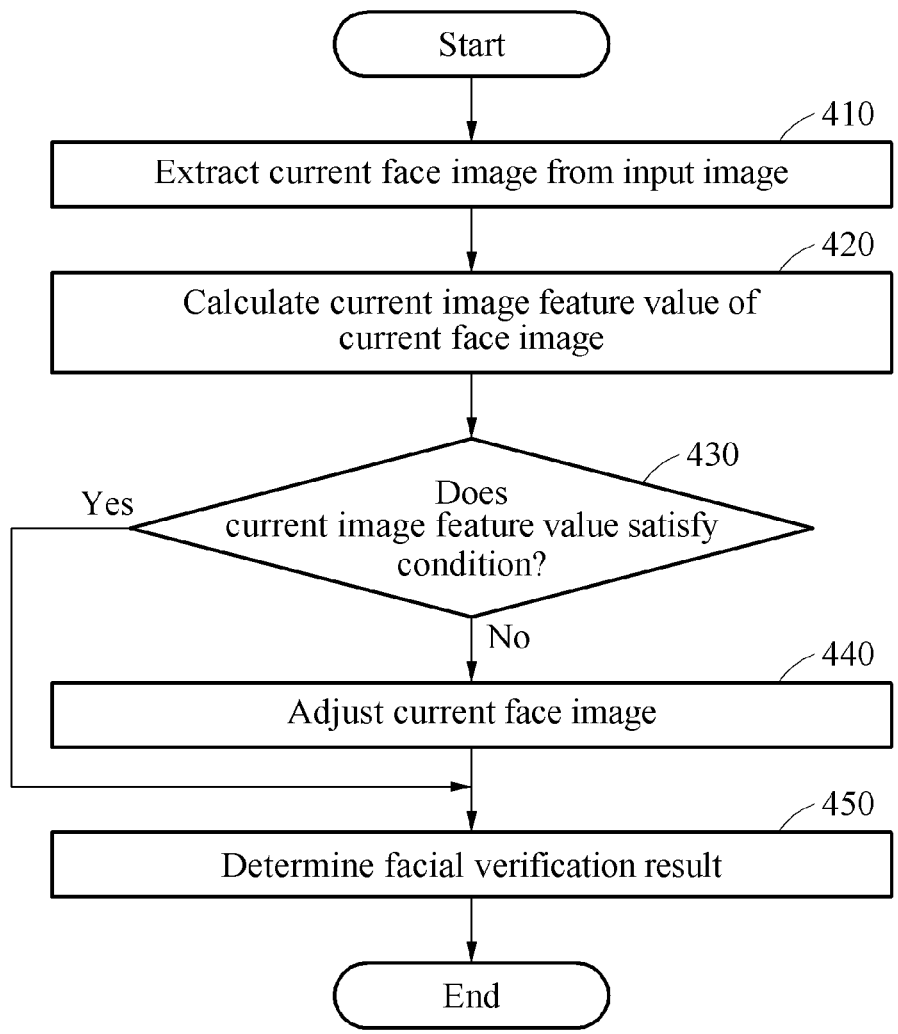
FIG. 4 is a flowchart illustrating an example of facial verification method.

FIG. 4 is a flowchart illustrating an example of a facial verification method. The facial verification method to be described hereinafter may be performed by a facial verification apparatus.

Referring to FIG. 4, in operation 410, the facial verification apparatus extracts a current facial image of a face region from an input image. As described above in operation 310 with reference to FIG. 3, the facial verification apparatus may detect the face region in the input image, and obtain the current facial image which is an image of the detected face region.

In operation 420, the facial verification apparatus calculates a current image feature value of the current facial image. The current image feature value may correspond to characteristic information of the current facial image. In an example, the facial verification apparatus calculates the image feature value, for example, a hue value of the current facial image, a face tilt indicating a degree of tilt of a face in the current facial image, and/or a white balance of the face region in the current facial image.

In operation 430, the facial verification apparatus determines whether the current image feature value satisfies a defined condition. In an example, the facial verification apparatus compares the current image feature value to a range based on respective image feature values of a plurality of facial images used to train a neural network, and determines whether the current image feature value is included in the range. The neural network may be a neural network used to verify a face object in the input image, or a neural network used to perform a liveness test on the face object.

The range based on the image feature values of the facial images used for the training may correspond to the feature value range described above with reference to FIG. 3, and be defined as an absolute range or a statistical range according to an example. For the absolute range, the size of the range may be determined by a minimum image feature value and a maximum image feature value among the image feature values of the facial images used for the training. For the statistical range, the size of the range may be determined based on a mean and a standard deviation of the image feature values of the facial images used for the training. For example, the statistical range may be defined as a range of N standard deviations on both sides from the mean as a center, in which N denotes a natural number.

In operation 440, when the current image feature value does not satisfy the defined condition, or when the current image feature value is out of the range, the facial verification apparatus adjusts the current facial image such that the image feature value of the current facial image is included in the range. For example, when the hue value of the current facial image is out of the range, the facial verification apparatus adjusts the hue value of the current facial image such that the hue value of the current facial image is included in the range. For another example, when the face tilt of the face object in the current facial image is out of the range, the facial verification apparatus rotates the face region of the current facial image such that the face tilt is included in the range. For still another example, when the white balance of the current facial image is out of the range, the facial verification apparatus adjusts the white balance of the current facial image such that the white balance of the current facial image is included in the range.

In operation 450, the facial verification apparatus determines a facial verification result. When the current facial image is adjusted in operation 440, the facial verification apparatus inputs the adjusted current facial image to the neural network. However, when operation 440 is not performed, the facial verification apparatus inputs, to the neural network, the current facial image extracted in operation 410. The neural network outputs a feature value corresponding to input information. The facial verification apparatus determines a similarity between the feature value obtained from the neural network and a feature value registered in advance by a valid user, and determines facial verification to be successful when the similarity is greater than a threshold value. However, when the similarity is less than or equal to the threshold value, the facial verification apparatus determines the facial verification to be unsuccessful. The registered feature value of the valid user may also be determined through the neural network.

Figure 5:
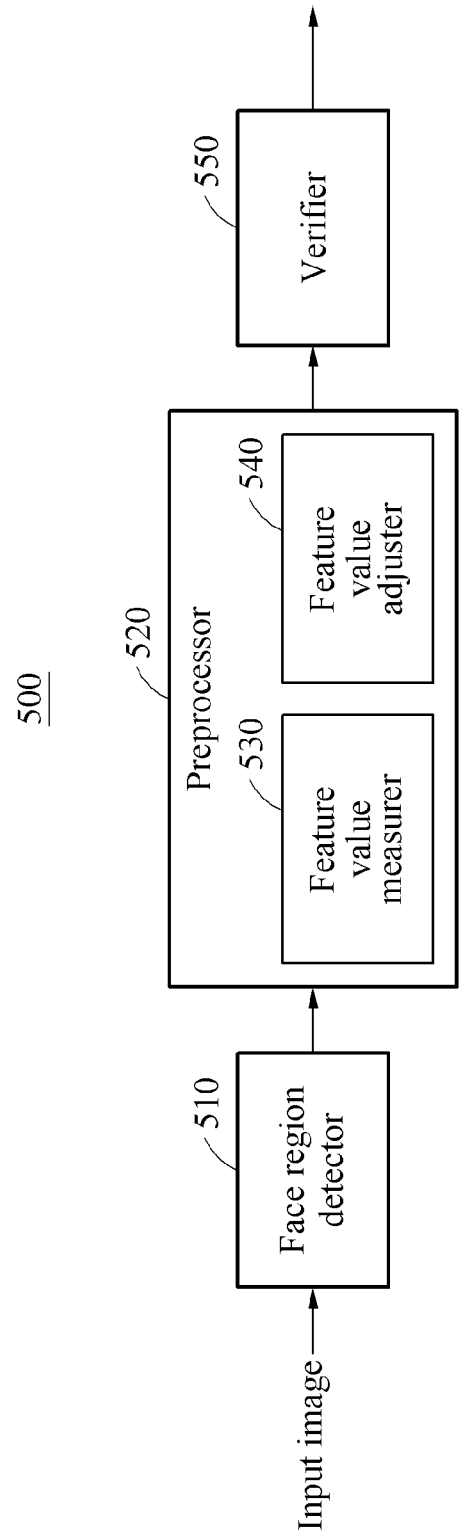
FIG. 5 is a diagram illustrating an example of operation of a facial verification apparatus.

FIG. 5 is a diagram illustrating an example of an operation of a facial verification apparatus.

Referring to FIG. 5, a facial verification apparatus 500 may perform a liveness detection and/or facial verification. The facial verification apparatus 500 includes a face region detector 510, a preprocessor 520, and a verifier 550. The face region detector 510 detects a face region in an input image. The face region detector 510 detects the face region using, as a non-limiting example, a cascade adaboost classifier and a Viola-Jones detector.

The preprocessor 520 performs a preprocessing process to improve the accuracy of a result of a liveness detection. The preprocessor 520 includes a feature value measurer 530 and a feature value adjuster 540. The feature value measurer 530 measures characteristic information or an image feature value (hereinafter a feature value), for example, a hue, a white balance, a brightness, and a gamma of the face region, a face tilt indicating a tilt of a face included in the face region, and the like.

The feature value adjuster 540 determines whether the feature value measured by the feature value measurer 530 satisfies a preset condition. In response to the measured feature value not satisfying the condition, the feature value adjuster 540 adjusts the feature value of the face region such that the feature value satisfies the condition. In an example, the feature value adjuster 540 determines whether the measured feature value is included in a range of feature values of facial images used to train a neural network. The feature value adjuster 540 adjusts the feature value of the face region such that the feature value measured from the face region in the input image is included in the range of the feature values of the facial images used to train the neural network.

For example, when the feature value associated with, for example, the hue, the white balance, the brightness, and/or the gamma of the face region is not included in a preset range, the feature value adjuster 540 adjusts the feature value such that the feature value is included in the range. For another example, when the face tilt is not included in a preset range, the feature value adjuster 540 rotates the face region such that the face tilt is included in the range. When the feature value measurer 530 measures a plurality of feature values, and one or more of the measured feature values do not satisfy the condition, the feature value adjuster 540 adjusts the one or more feature values that do not satisfy the condition.

When the feature value is adjusted, the verifier 550 performs a liveness detection and/or facial verification on a test object based on a face region with the adjusted feature value, and provides a result of the liveness detection and/or the facial verification.

For example, the verifier 550 determines a liveness value using a neural network-based liveness detection model, and determines whether the test object is live based on the determined liveness value. In this example, information of the face region with the adjusted feature value, for example, a pixel value, is input to the liveness detection model, and the liveness detection model outputs a liveness value corresponding to the input information. The verifier 550 compares the output liveness value and a threshold value, and determines a result of the liveness detection on the test object. When the feature value measured by the feature value measurer 530 satisfies the condition, for example, when the measured feature value is included in a defined feature value range, the feature value adjuster 540 does not adjust the feature value, and the verifier 550 immediately performs the liveness detection based on the face region detected by the face region detector 510.

In an example, when the test object is determined to be a genuine object as a result of the liveness detection, the facial verification is performed. In this example, when the feature value measured by the feature value measurer 530 does not satisfy the condition, for example, when the measured feature value is not included in the defined feature value range, the verifier 550 inputs the face region with the feature value adjusted by the feature value adjuster 540 to a neural network for extracting a feature value. When the feature value measured by the feature value measurer 530 satisfies the condition, for example, when the measured feature value is included in the defined feature value range, the verifier 550 inputs the face region for which the feature value is not adjusted to the neural network for extracting a feature value.

The verifier 550 compares a feature value obtained or output from the neural network and a feature value of a valid user that is registered in advance, and determines the facial verification to be successful in response to a similarity between the two feature values being greater than a threshold value. However, in response to the similarity being less than or equal to the threshold value, the verifier 550 determines the facial verification to be unsuccessful.

The preprocessor 520 transforms, through a preprocessing operation, a corner case that is not learned or trained, or not fully learned or trained, in a training process for the neural network used for the liveness detection and/or the facial verification, into a fully trained case, thereby increasing accuracy in processing the corner case. Here, it may not be easy to train the neural network because training data corresponding to the corner case is not present, or the training data is present in small quantity. However, the preprocessing operation of the preprocessor 520 described above may enable the liveness detection and/or the facial verification to be performed robustly against such corner case while maintaining basic recognition performance of the neural network.

Figure 6:
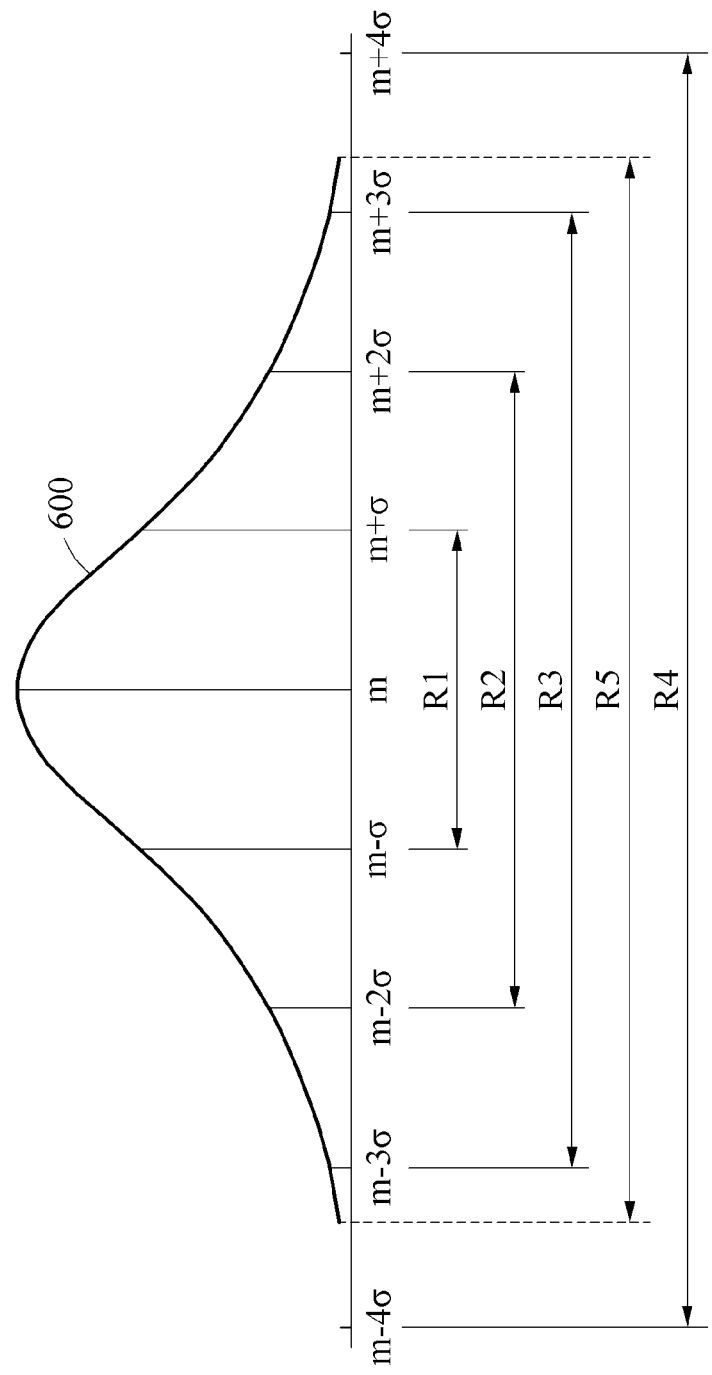
FIG. 6 is a diagram illustrating an example of absolute range and a statistical range.

FIG. 6 is a diagram illustrating an example of an absolute range and a statistical range.

A range that is defined in advance may be used to determine whether a face region in an input image is suitable or desirable for a liveness detection or facial verification. The range may correspond to a range of image feature values of a plurality of facial images (hereinafter training images) used to train a neural network used to obtain a liveness value or a feature value. Each of the training images may have an image feature value, and the range may be determined based on a distribution of the respective image feature values of the training images. For example, when an image feature value of the input image is out of the range, for example, when the image feature value is not included in the range, a preprocessing operation may be performed to adjust the input image such that the image feature value of the input image is included in the range.

In an example, the range may be an absolute range that is defined as a range between a minimum image feature value and a maximum image feature value among the image feature values of the training images. In another example, the range may be a statistical range to be determined based on a distribution characteristic, for example, a mean and a standard deviation, of the image feature values of the training images.

Referring to FIG. 6, a graph 600 illustrates a distribution of image feature values of training images. In the graph 600, an absolute range corresponds to a range R5 between a minimum image feature value and a maximum image feature value among the image feature values. A statistical range may be determined in various ways according to an example. For example, the statistical range corresponds to a range R1 indicating a range of 1 standard deviation a on both sides from a mean m, as a center, of the image feature values of the training images, a range R2 indicating a range of 2 standard deviations on both sides from the mean m, a range R3 indicating a range of 3 standard deviations on both sides from the mean m, or a range R4 indicating a range of 4 standard deviations on both sides from the mean m.

Figure 7:
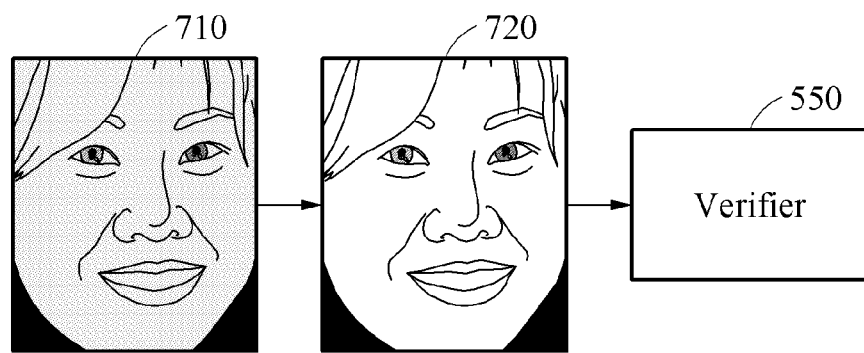
FIG. 7 is a diagram illustrating an example of preprocessing operation to adjust a hue.

FIG. 7 is a diagram illustrating an example of a preprocessing operation to adjust a hue.

Referring to FIG. 7, a face region 710 in an input image has a hue with an abnormal value. The feature value measurer 530 measures the hue of the face region 710. For example, the feature value measurer 530 measures a feature value corresponding to the hue based on a ratio of a blue B color element to a green G color element of the face region 710. The feature value adjuster 540 determines whether the measured feature value is in a preset range or a threshold range.

In response to the feature value not being included in the threshold range, the feature value adjuster 540 performs preprocessing on the face region 710. The feature value adjuster 540 obtains a face region 720 through the preprocessing by which the feature value adjuster 540 adjusts the hue of the face region 710 to be a hue included in the threshold range by applying a hue adjustment model to the face region 710. The verifier 550 performs a liveness detection and/or facial verification based on the face region 720 obtained through the preprocessing.

Figure 8:
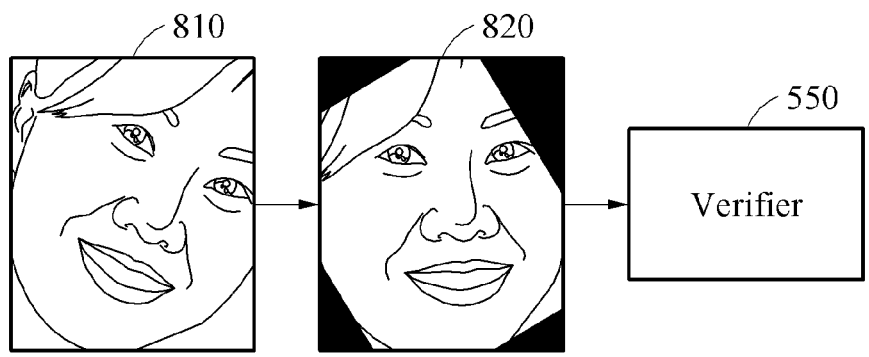
FIG. 8 is a diagram illustrating an example of preprocessing operation to adjust a face tilt.

FIG. 8 is a diagram illustrating an example of a preprocessing operation to adjust a face tilt.

Referring to FIG. 8, a face region 810 in an input image includes a face tilted by an abnormal value or has a face tilt with an abnormal value. The face of the face region 810 is tilted by an angle clockwise. When the face region 810 is input, the feature value measurer 530 measures the face tilt of the face region 810. For example, the feature value measurer 530 detects feature points corresponding to a left eye, a right eye, and both mouth ends in the face region 810, and measures the face tilt based on an angle formed between a reference line (e.g., vertical line or horizontal line) and a determined straight line passing a determined first center point between the feature points corresponding to the left eye and the right eye and a determined second center point between the feature points corresponding to both mouth ends.

The feature value adjuster 540 determines whether the measured face tilt is included in a preset range or a threshold range. In response to the face tilt not being included in the range, the feature value adjuster 540 adjusts the face tilt of the face region 810. The feature value adjuster 540 obtains a face region 820 through preprocessing by which the feature value adjuster 540 rotates the face region 810 by an angle such that the face tilt is included in the range. The verifier 550 performs a liveness detection and/or facial verification based on the face region 820 obtained through the preprocessing.

Figure 9B:
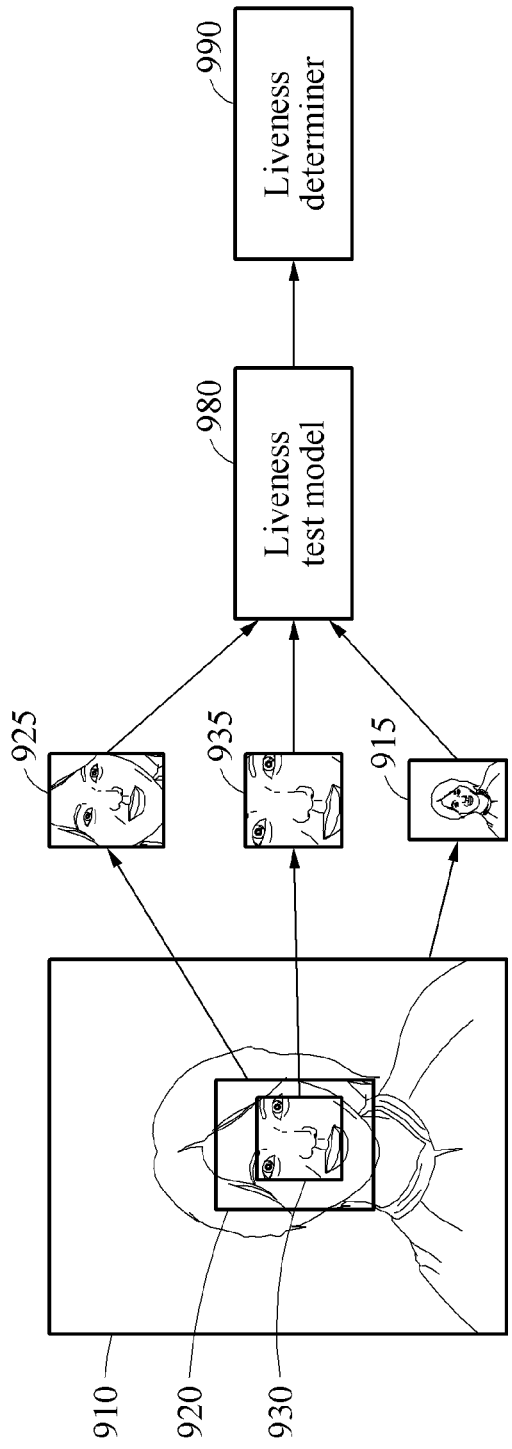

FIGS. 9A and 9B are diagrams illustrating examples of a liveness detection method.

Referring to FIG. 9A, an entire face region 920 is detected in an input image 910, including a test object, and a partial face region 930 including a portion of the entire face region 920 is determined.

In an example, image information of a first image 925 corresponding to the entire face region 920 is input to a first liveness detection model 940, and the first liveness detection model 940 outputs a first liveness value corresponding to the first image 925. The first image 925 may be an image obtained by performing image normalization, as a non-limiting example, a size adjustment and an affine transform, on the entire face region 920. In addition, image information of a second image 935 corresponding to the partial face region 930 is input to a second liveness detection model 950, and the second liveness detection model 950 outputs a second liveness value corresponding to the second image 935. The second image 935 may be an image obtained by performing image normalization on the partial face region 930. In addition, image information of a third image 915 corresponding to an entire region of the input image 910 is input to a third liveness detection model 960, and the third liveness detection model 960 outputs a third liveness value corresponding to the third image 915. The third image 915 may be the same as the input image 910, or an image obtained by performing image normalization on the input image 910.

In this example, a preprocessing operation may be performed to adjust characteristic information or a feature value of a face region such that the feature value of the face region satisfies a preset condition, and liveness values, for example, a first liveness value, a second liveness value, and a third liveness value, may be determined based on an image corresponding to a preprocessed image, for example, a first image, a second image, and a third image.

A liveness determiner 970 determines a final liveness value based on the first liveness value, the second liveness value, and the third liveness value, and determines whether the test object is live based on whether the determined final liveness value satisfies a preset condition. The final liveness value may be, as a non-limiting example, a sum, a mean, or a weighted sum of the first liveness value, the second liveness value, and the third liveness value.

The first liveness detection model 940, the second liveness detection model 950, and the third liveness detection model 960 illustrated in FIG. 9A may be embodied by a single liveness detection model 980 as illustrated in the example of FIG. 9B. In the example of FIG. 9B, the image information of the first image 925, the image information of the second image 935, and the image information of the third image 915 are input to at least one input layer of the liveness detection model 980. For example, the image information of the first image 925, the image information of the second image 935, and the image information of the third image 915 are input to different input layers of the liveness detection model 980, or combined with one another to be input to a single input layer of the liveness detection model 980. The liveness detection model 980 then outputs liveness values respectively corresponding to the first image 925, the second image 935, and the third image 915, and a liveness determiner 990 determines whether the test object is live based on whether a liveness value satisfies a preset condition.

Figure 10:
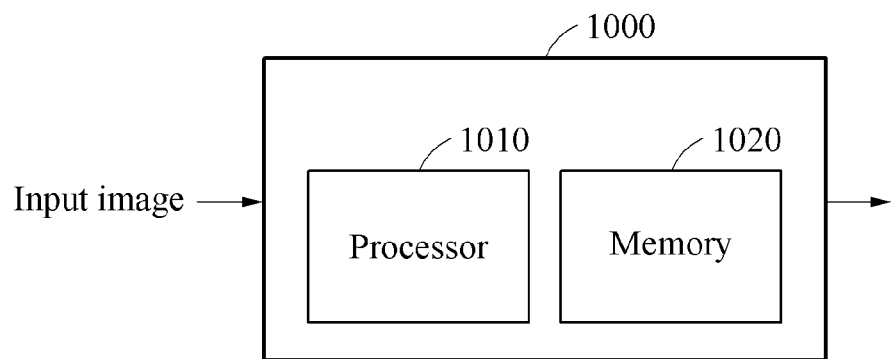
FIG. 10 is a diagram illustrating an example of facial verification apparatus.

FIG. 10 is a diagram illustrating an example of a facial verification apparatus.

A facial verification apparatus 1000 may perform facial verification on an object included in an input image. The facial verification apparatus 1000 may perform a liveness detection during the facial verification, and provide a result of the facial verification based on a result of the liveness detection. The facial verification apparatus 1000 may perform one or more or all operations or stages, or methods described herein in relation to the liveness detection or the facial verification, and provide a user with a result of the liveness detection or a result of the facial verification.

Referring to FIG. 10, the facial verification apparatus 1000 includes a processor 1010 and a memory 1020. The memory 1020 may be connected to the processor 1010, and store instructions that may be executed by the processor 1010, data to be processed by the processor 1010, and/or data processed by the processor 1010.

The processor 1010 may perform one or more or all operations or stages, or methods described above in relation to a liveness detection and/or facial verification with reference to FIGS. 1 through 9B. In an example, for the liveness detection and/or the facial verification, the processor 1010 may use a network trained with a plurality of facial images each having an image feature value. In this example, a neural network may be used as the network to perform a liveness detection on a face object in an input image or to verify the face object.

For the liveness detection, the processor 1010 may detect a face region, which is a test object for the liveness detection, in an input image, and measure characteristic information (or hereinafter a feature value) of the detected face region. The processor 1010 may measure the feature value, as a non-limiting example, a hue, a white balance, a brightness, and a gamma of the face region, and a face tilt of a face included in the face region.

The processor 1010 may determine whether the measured feature value satisfies a condition. In response to a determination that the feature value does not satisfy the condition, the processor 1010 may perform preprocessing to adjust the feature value. For example, when the feature value, such as a feature value of a hue, a white balance, a brightness, and/or a gamma of the face region is not included in a preset range, the processor 1010 may adjust the feature value of the face region such that the feature value is included in the range. For another example, when the feature value, such as a face tilt, is not included in a preset range, the processor 1010 may rotate the face region such that the face tilt is included in the range. The processor 1010 may then perform the liveness detection based on a face region with the adjusted feature value.

In addition, in response to a determination that the feature value of the face region satisfies the condition, the processor 1010 may perform the liveness detection based on the face region detected in the input image, without adjusting the feature value.

In an example, the processor 1010 may obtain a liveness value using a liveness detection model based on the trained neural network, compare the obtained liveness value and a threshold value, and determine a result of the liveness detection based on a result of the comparing. For example, in response to the liveness value being greater than the threshold value, the processor 1010 may determine the test object to be a genuine object. In this example, in response to the liveness value being less than or equal to the threshold value, the processor 1010 may determine the test object to be a fake object.

For the facial verification, the processor 1010 may extract a current facial image of a face region from an input image, and calculate a current image feature value of the current facial image. The processor 1010 may compare the current image feature value to a range of respective image feature values of facial images used to train the neural network, and determine whether the current image feature value is included in the range or not.

In an example, the range of the image feature values may be an absolute range to be determined based on a minimum image feature value and a maximum image feature value among the image feature values of the facial images used to train the neural network. In the absolute range, a minimum value may be the minimum image feature value, and a maximum value may be the maximum image feature value.

In another example, the range of the image feature values may be a statistical range to be determined based on a distribution characteristic of the image feature values of the facial images used to train the neural network. The distribution characteristic may include, for example, a mean and a standard deviation of the image feature values.

When the current image feature value is out of the range, the processor 1010 may adjust the current facial image such that the image feature value of the current facial image is included in the range, and input the adjusted current facial image to the neural network. Here, the neural network may output a feature value corresponding to input information.

For example, to adjust the current facial image, the processor 1010 calculates a hue value of the current facial image. In this example, when the calculated hue value is out of the range, the processor 1010 adjusts the hue value of the current facial image such that the hue value of the current facial image is included in the range. For another example, the processor 1010 calculates a face tilt indicating a degree of a face in the current facial image. In this example, when the calculated face tilt is out of the range, the processor 1010 rotates the face region of the current facial image such that the face tilt is included in the range. For still another example, the processor 1010 calculates a white balance of the face region in the current facial image. In this example, when the calculated white balance is out of the range, the processor 1010 adjusts the calculated white balance of the current facial image such that the white balance is included in the range.

The processor 1010 may compare the feature value obtained through the neural network and a feature value registered in advance, and determine a result of the facial verification based on a similarity between the two feature values. For example, in response to the similarity being greater than a threshold value, the processor 1010 may determine the facial verification to be successful. In response to the similarity being less than or equal to the threshold, the processor 1010 may determine the facial verification to be unsuccessful.

The processor 1010 may generate a control signal based on a result of the liveness detection or a result of the facial verification. For example, the processor 1010 may generate the control signal to determine whether to allow or block an access of an object based on such result, or whether to disallow or execute a request from the object, for example, a request for execution of a corresponding function.

Figure 11:
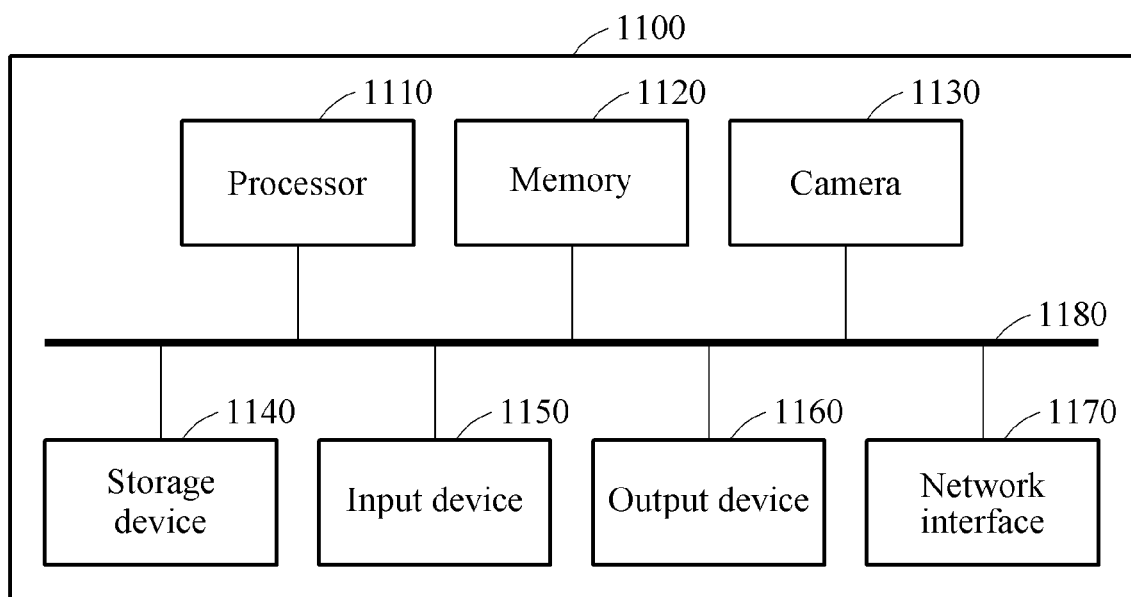
FIG. 11 is a diagram illustrating an example of electronic apparatus.

FIG. 11 is a diagram illustrating an example of an electronic apparatus.

An electronic apparatus 1100 may perform a liveness detection and/or facial verification on a test object included in an input image. The electronic apparatus 1100 may correspond to the electronic apparatus 120 illustrated in FIG. 1, and perform a function or operation of the facial verification apparatus 1000 illustrated in FIG. 10.

Referring to FIG. 11, the electronic apparatus 1100 includes a processor 1110, a memory 1120, a camera 1130, a storage device 1140, an input device 1150, an output device 1160, and a network interface 1170. The processor 1110, the memory 1120, the camera 1130, the storage device 1140, the input device 1150, the output device 1160, and the network interface 1170 may communicate with one another through a communication bus 1180.

The processor 1110 may perform functions and execute instructions to perform the liveness detection and/or the facial verification. For example, the processor 1110 may process instructions stored in the memory 1120 or the storage device 1140. The processor 1110 may perform one or more or all operations or stages, or methods described above with reference to FIGS. 1 through 10.

The memory 1120 may store information used to perform the liveness detection and/or the facial verification. The memory 1120 may include a computer-readable storage medium or a computer-readable storage device. The memory 1120 may store instructions to be executed by the processor 1110 and information needed to perform the liveness detection and/or the facial verification.

The camera 1130 may obtain a still image, a moving or video image, or both the still and moving images that includes a test object for the liveness detection and/or the facial verification. The image obtained by the camera 1130 may correspond to an input image described herein.

The storage device 1140 may include a computer-readable storage medium or a computer-readable storage device. The storage device 1140 may store a greater amount of information than the memory 1120, and store the information for a relatively long period of time. The storage device 1140 may include, as a non-limiting example, a magnetic hard disk, an optical disk, a flash memory, and a floppy disk.

The input device 1150 may receive an input from a user, as a non-limiting example, a tactile input, a video input, an audio input, and a touch input. The input device 1150 may detect the input from, as a non-limiting example, a keyboard, a mouse, a touchscreen, a microphone, and the user, and include other devices configured to transfer the detected input to the electronic apparatus 1100.

The output device 1160 may provide the user with an output of the electronic apparatus 1100 through a visual, audio, or tactile channel. The output device 1160 may include, as a non-limiting example, a display, a touchscreen, a speaker, a vibration generator, and other devices configured to provide the user with the output. The network interface 1170 may communicate with an external device through a wired or wireless network.

The liveness detection apparatus, the facial verification apparatuses, the facial verification apparatus 500, 1000, the face region detector 510, the preprocessor 520, the feature value measurer 530, the feature value adjuster 540, the verifier 550, the processor 1010, 1110 the memory 1020, 1120 the electronic apparatuses, the electronic apparatus 120, 1100, the camera 1130, the storage device 1140, the input device 1150, the output device 1160, the network interface 1170, the communication bus 1180, and other apparatuses, devices, units, modules, and other components described herein with respect to FIGS. 1-11 are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-11 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and providing the instructions or software and any associated data, data files, and data structures to a processor or computer so that the processor or computer can execute the instructions.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. A processor-implemented liveness detection method, comprising:
   detecting a face region in an input image;
   measuring characteristic information of the detected face region, wherein the characteristic information includes a hue value, a face tilt value, a white balance value, a brightness value, and a gamma value of the face region;
   in response to a determination that a feature value of the measured characteristic information includes the hue value, the face tilt value, the white balance value, the brightness value, and the gamma value is not included in a predetermined feature value range of feature values of characteristic information measured from other images, generating an adjusted face region by adjusting the characteristic information of the face region; and
   performing a liveness detection on the adjusted face region using a neural network-based liveness detection model generating an adjusted face region by adjusting the characteristic information of the face region such that the values included in the characteristic information fall within a respective pre-set absolute or statistical range.

2. The method of claim 1, wherein the measuring of the characteristic information of the face region comprises measuring the hue value of the face region,
   wherein the generating of the adjusted face region comprises:

in response to a determination that the measured hue value is not included in a preset hue value range as the predetermined feature value range, performing the generating of the adjusted face region by adjusting the hue value of the face region to a hue value included in the preset hue value range.

3. The method of claim 2, wherein the adjusting of the hue value of the face region comprises:
adjusting the measured hue value of the face region by applying a hue adjustment model to the face region.

4. The method of claim 1, wherein the measuring of the characteristic information of the face region comprises measuring the face tilt value indicating a degree of a tilt of a face included in the face region,
wherein the generating of the adjusted face region comprises:
in response to a determination that the measured face tilt value is not included in a preset face tilt value range as the predetermined feature value range, performing the generating of the adjusted face region by adjusting the face tilt value.

5. The method of claim 4, wherein the measuring of the face tilt value comprises:
detecting feature points corresponding to a left eye, a right eye, and both mouth ends in the face region; and
measuring the face tilt value based on the detected feature points.

6. The method of claim 4, wherein the adjusting of the face tilt value comprises:
adjusting the face tilt value by rotating the face region based on the measured face tilt value.

7. The method of claim 1, wherein the measuring of the characteristic information of the face region comprises measuring the white balance value of the face region,
wherein the generating of the face adjusted region comprises:
in response to a determination that the measured white balance value is not included in a preset white balance value range as the predetermined feature value range, performing the generating of the adjusted face region by adjusting the white balance value of the face region to a white balance value included in the preset white balance value range.

8. The method of claim 1, further comprising:
in response the determination that the measured characteristic information is included in the predetermined feature value range, performing the liveness detection based on the detected face region without performing the generating of the adjusted face region.

9. A non-transitory computer-readable storage medium storing instructions that, when executed by one or more processors, configure the one or more processors to perform the method of claim 1.

10. The method of claim 1, wherein a neural network is used to perform a facial verification on the adjusted face region.

11. A processor-implemented facial verification method using a neural network-based liveness detection model, the facial verification method comprising:
extracting a current facial image of a face region from an input image;
calculating a current image feature value of the current facial image;
comparing the current image feature value to a range of respective image feature values of training facial images include a hue value, a face tilt value, a white balance value, a brightness value, and a gamma value;
in response to a determination that the current image feature value, including the hue value, the face tilt value, the white balance value, the brightness value, and the gamma value, is out of the range of the respective image feature values, generating an adjusted current facial image by adjusting the current image feature value of the current facial image to be included in the range of the respective image feature values; and
inputting of the adjusted current facial image to the neural network-based liveness detection model generating an adjusted face region by adjusting the current image feature value of the face region such that the value included in the current image feature value fall within a respective pre-set absolute or a statistical range.

12. The method of claim 11, wherein the range of the respective image feature values is the absolute range determined based on a minimum image feature value and a maximum image feature value among the image feature values of the training facial images.

13. The method of claim 11, wherein the range of the respective image feature values is the statistical range determined based on a distribution characteristic of the image feature values of the training facial images, and
wherein the distribution characteristic includes a mean and a standard deviation of the image feature values.

14. The method of claim 13, wherein the statistical range is one of a range of 1 standard deviation, a range of 2 standard deviations, a range of 3 standard deviations, and a range of 4 standard deviations, on both sides from the mean as a center.

15. The method of claim 11, wherein the neural network is configured to verify a face object in the input image.

16. The method of claim 11, wherein the calculating of the current image feature value comprises:
calculating a hue value of the current facial image,
wherein the adjusting of the current facial image comprises:
in response to a determination that the calculated hue value is out of the range of the respective image feature values, generating the adjusted current facial image by adjusting the hue value of the current facial image to be included in the range of the respective image feature values.

17. The method of claim 11, wherein the calculating of the current image feature value comprises:
calculating a face tilt value indicating a degree of a tilt of a face in the current facial image,
wherein the adjusting of the current facial image comprises:
in response to a determination that the calculated face tilt value is out of the range of the respective image feature values, generating the adjusted current facial image by rotating the face region of the current facial image so a tilt value of the adjusted current facial image to be included in the range of the respective image feature values.

18. The method of claim 11, wherein the calculating of the current image feature value comprises:
calculating a white balance value of the face region in the current facial image,
wherein the adjusting of the current facial image comprises:
in response to a determination that the calculated white balance value is out of the range of the respective image feature values, generating the adjusted current facial image by adjusting the white balance value of the current facial image so a white balance value of the adjusted current facial image to be included in the range of the respective image feature values.

19. An apparatus, comprising:
one or more processors configured to:
detect a face region in an input image;
measure characteristic information of the detected face region wherein the characteristic information includes a hue value, a face tilt value, a white balance value, a brightness value, and a gamma value;
in response to a determination that a feature value of the measured characteristic information includes the hue value, the face tilt value, the white balance value, the brightness value, and the gamma value is not included in a predetermined feature value range of feature values of characteristic information measured from other images, generate an adjusted face region by adjusting the characteristic information of the face region; and
perform a liveness detection on the adjusted face region using a neural network-based liveness detection model generating an adjusted face region by adjusting the characteristic information of the face region such that the value included in the characteristic information fall within a respective pre-set absolute or a statistical range.

20. The apparatus of claim 19, wherein the one or more processors are further configured to:
measure the hue value of the face region; and
in response to a determination that the measured hue value is not included in a preset hue value range as the predetermined feature value range, perform the generating of the adjusted face region by adjusting the hue value of the face region to a hue value included in the preset hue value range.

21. The apparatus of claim 19, wherein the one or more processors are further configured to:
measure the face tilt value indicating a degree of a tilt of a face included in the face region; and
in response to a determination that the measured face tilt value is not included in a preset face tilt value range, perform the generating of the adjusted face region by adjusting the face tilt value.

22. The apparatus of claim 19, wherein the one or more processors are further configured to:
measure the white balance value of the face region; and
in response to a determination that the measured white balance value is not included in a preset white balance value range as the predetermined feature value range, perform the generating of the adjusted face region by adjusting the white balance value of the face region.

23. The apparatus of claim 19, wherein the one or more processors are further configured to:
in response to the determination that the feature value of the measured characteristic information is included in the predetermined feature value range, perform the liveness detection based on the detected face region without performing the generating of the adjusted face region.

24. The apparatus of claim 19, wherein the apparatus is any of a smartphone, a wearable device, a tablet computer, a netbook, a laptop computer, a desktop computer, a personal digital assistant (PDA), a set-top box, a home appliance, a biometric door lock, a security device, and a vehicle start device.

25. An apparatus using a neural network-based liveness detection model, the apparatus comprising:
one or more processors configured to:
extract a current facial image of a face region from an input image;
calculate a current image feature value of the current facial image;
compare the current image feature value to a range of respective image feature values of training facial images include a hue value, a face tilt value, a white balance value, a brightness value, and a gamma value;
in response to a determination that the current image feature value is out of the range of the respective image feature values, generate an adjusted current face region by adjusting the current facial image such that the current image feature value of the current facial image is included in the range of the respective image feature values; and
input the adjusted current facial image to the neural network-based liveness detection model generating an adjusted face region by adjusting the characteristic information of the face region such that the value included in the characteristic information fall within a respective pre-set absolute or a statistical range.

26. The apparatus of claim 25, wherein the range of the respective image feature values is the absolute range to be determined based on a minimum image feature value and a maximum image feature value among the image feature values of the facial images used to train the neural network.

27. The apparatus of claim 25, wherein the range of the respective image feature values is the statistical range to be determined based on a distribution characteristic of the image feature values of the facial images used to train the neural network,
wherein the distribution characteristic includes a mean and a standard deviation of the image feature values.

28. The apparatus of claim 25, wherein the neural network is used to verify a face object in the input image.

29. The apparatus of claim 25, wherein the one or more processors are configured to:
calculate the hue value of the current facial image; and
in response to a determination that the calculated hue value is out of the range of the respective image feature values, generate the adjusted current facial image by adjusting the hue value of the current facial image to be included in the range of the respective image feature values.

30. The apparatus of claim 25, wherein the one or more processors are configured to:
calculates the face tilt value indicating a degree of a tilt of a face in the current facial image; and
in response to a determination that the calculated face tilt value is out of the range of the respective image feature values, generate the adjusted current facial image by rotating the face region of the current facial image so a tilt value of the adjusted current facial image is included in the range of the respective image feature values.

31. The apparatus of claim 25, wherein the one or more processors are configured to:
calculate the white balance value of the face region in the current facial image; and
in response to a determination that the calculated white balance value is out of the range of the respective image feature values, generate the adjusted current facial image by adjusting the white balance value of the current facial image to be included in the range of the respective image feature values.

32. The apparatus of claim 25, wherein the one or more processors are configured to:

calculate any one or any combination of any two or more of the hue value, the face tilt value, and the white balance value of the current facial image; and in response to any one or any combination of any two or more of the calculated hue value, the calculated face tilt value, and the calculated white balance value being respectively determined to be out of the range of respective image feature values, generating the adjusted face region by respectively adjusting an out of range image feature values to be within the respective range of image feature values.

* * * * *